(12) United States Patent
Barron

(10) Patent No.: US 8,695,833 B2
(45) Date of Patent: Apr. 15, 2014

(54) CLOSEABLE OPENING DEVICES

(75) Inventor: Dan Barron, Schaffhausen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/823,734

(22) PCT Filed: Aug. 26, 2011

(86) PCT No.: PCT/EP2011/064703
§ 371 (c)(1),
(2), (4) Date: Mar. 14, 2013

(87) PCT Pub. No.: WO2012/034836
PCT Pub. Date: Mar. 22, 2012

(65) Prior Publication Data
US 2013/0193146 A1  Aug. 1, 2013

(30) Foreign Application Priority Data

Sep. 15, 2010 (DE) .......................... 10 2010 040 825
Apr. 29, 2011 (DE) .......................... 10 2011 017 797

(51) Int. Cl.
  *B65D 17/42* (2006.01)
(52) U.S. Cl.
  USPC .......... 220/277; 29/525; 220/258.1; 220/278; 215/344
(58) Field of Classification Search
  USPC ............................. 220/277; 215/257; 222/83
  See application file for complete search history.

(56) References Cited

U.S. PATENT DOCUMENTS 5,141,133 A * 8/1992 Ninomiya et al. .............. 222/83
5,147,070 A   9/1992 Iwamoto
(Continued)

FOREIGN PATENT DOCUMENTS

| JP | 2000016453 | 1/2000 |
| JP | 2000344264 | 12/2000 |
| WO | 9505996 | 3/1995 |

OTHER PUBLICATIONS

PCT/EP2011/064703 International Search Report dated Nov. 17, 2011 (Translation and Original, 8 pages).

*Primary Examiner* — J. Gregory Pickett
*Assistant Examiner* — Raven Collins
(74) *Attorney, Agent, or Firm* — Michael Best & Friedrich LLP

(57) ABSTRACT

The closeable opening device according to the invention comprises a base (2) in which a cutting element (3) is supported. Driving dogs (42) in the closing screw cap (4) engage with driving dogs (32) in the cutting element (3), so that the cutting element (3) is displaced in the base (2) to the end position upon initial opening. At least one first rotational stop (5, 50) ensures that the cutting element remains in position and neither moves upward in an undesired manner when the screw cap is opened, nor can be displaced downward by any relative displacement of the two parts, thus causing same to fall into the container. The first rotational stop (5) is made of a rib (50) on the inner face of the spout (20), which interacts with a recess in the form of a flat spot (35) on the cutting element (3). A second rotational stop (5) made of a stop cam (52) can additionally be present at the spout end (51) of the inner thread (24) in the spout (20), against which the inlet end (36) of the outer thread (31) on the cutting element (3) is stopped. When using both rotational stops (5), an end position of the cutting element (3) is secured in a form-fit as well as force-fit manner in the base (2).

5 Claims, 2 Drawing Sheets

(56) References Cited

U.S. PATENT DOCUMENTS

| | | |
|---|---|---|
| 7,207,465 B2 | 4/2007 | Weist |
| 2004/0104245 A1 | 6/2004 | Dubach |
| 2006/0071000 A1* | 4/2006 | Weist et al. .................. 220/278 |
| 2006/0261028 A1* | 11/2006 | Dubach ........................ 215/257 |
| 2009/0250488 A1 | 10/2009 | Dubach |

* cited by examiner

CLOSEABLE OPENING DEVICES

BACKGROUND OF THE INVENTION

The present invention relates to a closeable opening device for a container made of plastic film, said device consisting of a base, which comprises a cylindrical spout and a flange for mounting on the container, a screw cap that is screwably connected to the base, as well as a cylindrical cutting element having outer thread, wherein the cutting element is open on both sides in the axial direction and engages an inner thread in the spout of the base, wherein at least one driving dog is present in the screw cap, which displaces the cutting element that has at least one driving dog arranged therein downwards in a screw-like manner upon initial opening of said screw cap, and wherein the cutting element has at least one cutting tooth on the lower edge.

Closeable opening devices of the type mentioned above have been known for a long time for containers made of laminated film material. More and more containers have recently come on the market, which are manufactured from pure, single- or multi-layered plastic films. Such containers are referred to as tubular bags or for the most part the English term "pouches" is used. The closeable opening devices typically comprise a base attached directly to the container or respectively the tubular bag and a screw cap detachably attached to the base for closing a spout in said base. In order to mount the opening device, a flange of the base is non-detachably attached to the plastic film of the tubular bag in a cohesive connection by means of ultrasonic welding.

Opening devices of the type mentioned here have been known for many years. By way of example, reference is made in this regard to the patent documents U.S. Pat. No. 5,147,070 A, U.S. Pat. No. 5,141,133 or also to the WIPO patent publication 2004/000667 and the WIPO patent publication 2004/03055.

Opening devices of this type are manufactured in great quantities and mounted on containers. In the beginning, it was hereby assumed that the same opening devices, as they were mounted on containers made from laminated cardboard combined with plastic films, could be used on containers that were made from pure plastic films. This is in fact correct in its basic concept; however, the mounting of the opening devices on pure plastic films is only possible by means of ultrasonic welding and correspondingly measures were taken in this regard which improve the welded connection and perform the same more quickly.

In order to improve the weld, attention has been placed up until now on the configuration of the energy-introducing ribs. The patent documents JP 2000016453 and also JP 2000344264 disclose, for example, solutions in this regard.

In addition, the thickness of the flange on the base has been embodied ever thinner to save energy on the one hand and to reduce the cycle times of the welding process on the other hand. Because this lies in the area of the expert's decision making and this is also a part of the know-how of the manufacturer, there is no suggestive information in this regard in the patent literature.

The entire closeable opening device is more flexible due to of the thin-walled design of the flange. As a result, the danger exists that the cutting element can inadvertently displace relative to the spout prior to initial use as well as after initial use. In particular after the initial opening, the problem arises on account of this relative displacement that the cutting element possibly deforms toward the top or bottom in the cylindrical spout due to the deformation of said spout or due to the flange welded on the container such that the cutting element moves either upward or downward in the cylindrical spout. If said cutting element moves upward, the driving dogs on the screw cap come again in contact with the corresponding driving dogs in said cutting element in an undesirable manner and said cutting element also in turn moves upward or downward when the closure is repeatedly opened or closed. This is undesirable because it can occur as a result of said repeated movements that the partially cut-open film, which practically protrudes downward into the container in the form of a flap, becomes completely separated and falls into the container. Because these containers are frequently used for food items, such as drinks or sauces, aggravating liability problems can thereby arise. It is likewise undesirable if the cutting element moves somewhat further downward and then is no longer held in the spout and consequently falls into the container. In so doing, there is hardly a threat posed to the health of the user, but the cutting element can come to rest in front of the spout during further use and impair the function thereof to such an extent that the pouring stream is deflected, which can correspondingly lead to clothes becoming soiled.

SUMMARY OF THE INVENTION

It is therefore the aim of the present invention to improve a closeable opening device of the aforementioned type in such a way that the problems mentioned above no longer occur.

This aim is met by a closeable opening device which is characterized in that the spout comprises a rotational stop, which secures the cutting device within the spout in the position in which the cutting device is situated immediately after initially unscrewing the cap from the base, whereby the further relative movement of the cutting device with respect to the base is prevented.

BRIEF DESCRIPTION OF THE DRAWINGS

Further advantageous embodiments of the subject matter of the invention ensue from the dependent patent claims, and the effectiveness and mode of operation thereof are described in the following description while making reference to the accompanying drawings. In the drawings:

DETAILED DESCRIPTION

Figure 1:
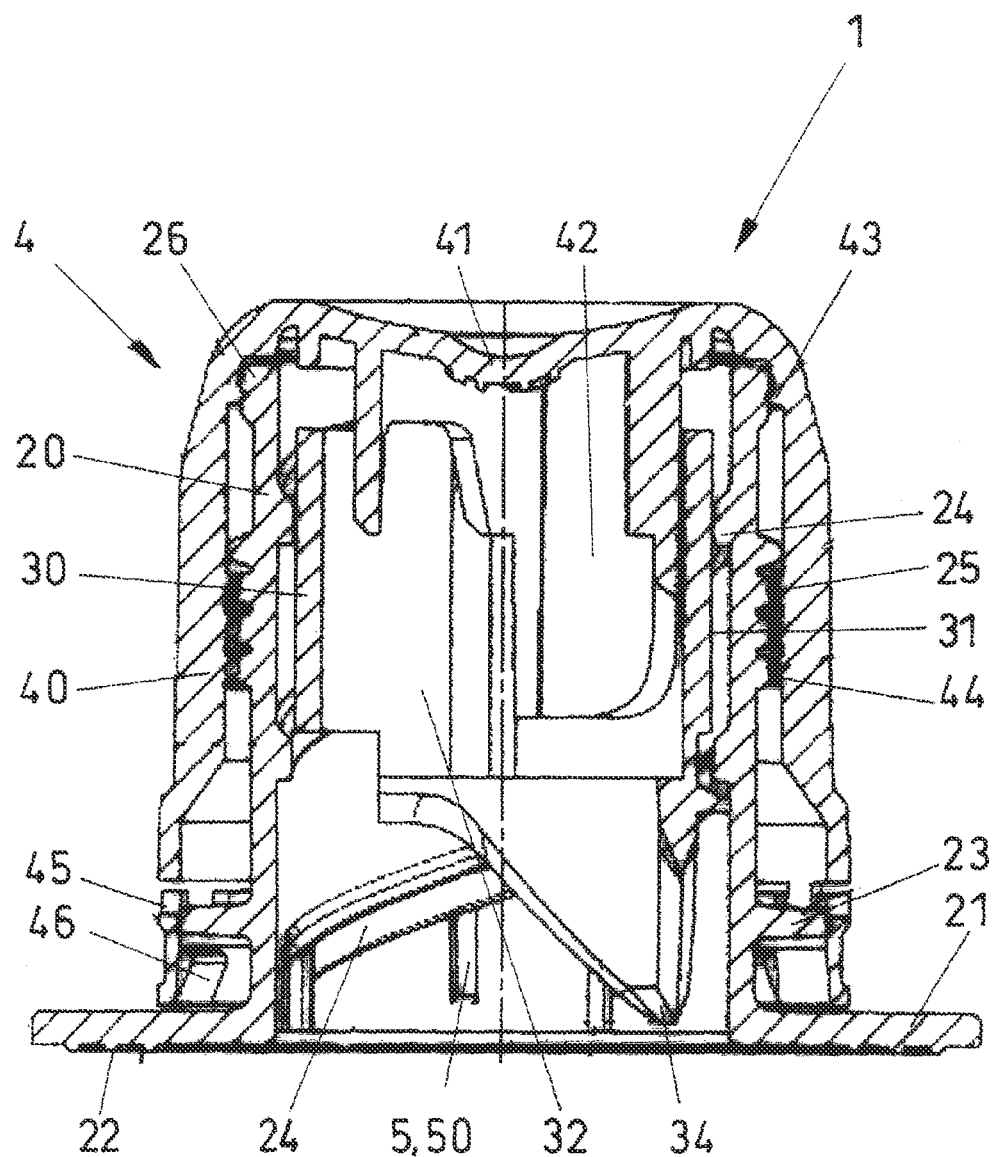
FIG. 1 shows the closeable opening device according to the invention in the assembled state prior to the initial opening in a diametrical vertical section and FIG. 2 shows the base of the opening device by itself in a perspective depiction with a view to the underside and FIG. 3 shows the cylindrical cutting element by itself again in a perspective side view as seen slightly from below.

The closeable opening device according to the invention is in its entirety denoted with the reference numeral 1. Said device consists of three individual parts, namely a base 2, a cutting element 3 guided therein so as to move in a screw-like fashion and screw cap 4, which can be fitted to said cutting element and closes the opening device.

The base 2 consists of a cylindrical pipe section, which forms the spout 20, and a flange 21, which is terminally disposed in alignment with the lower edge of the spout 20 in an outwardly directed manner. A plurality of circumferential energy-introducing ribs 22 running concentrically to each other are integrally formed on the underside of the flange 21. In addition, the spout 20 comprises a collar 23 which protrudes outwards and runs circumferentially parallel to the flange 21. The spout 20 is furnished with an inner thread 24. On the outside, the spout 20 is furnished with an outer thread 25. Whereas the outer thread 25 is embodied as fine thread and has a small pitch, the inner thread 24 is embodied as coarse thread with a large pitch. The upper edge of the cylindrical spout 20 is configured with a circumferential sealing bead 26.

As previously mentioned, the cutting element 3 is mounted in the spout 20 so as to be movable in a screw-like fashion. The cutting element 3 consists of a cylindrical pipe section 30, which is open on both sides. An outer thread 31 is integrally formed on the outside of the cylindrical pipe section 30. Said outer thread 31 meshes with the inner thread 24 of the spout 20. An inwardly protruding driving dog 32 is integrally formed on the inner wall of the cylindrical pipe section 30. Said cylindrical pipe section 30 has a lower end face 33, and a downwards directed cutting tooth 34 aligned with the wall of the cylindrical pipe section 30 is integrally formed thereon. The design of the cutting tooth or cutting teeth, in the event a plurality of cutting teeth is present, is insignificant in this case. In the assembled state prior to the initial use, the at least one cutting tooth 34 is situated above the underside of the flange. In so doing, it is ensured that the film of the tubular bag does not come in contact with the cutting tooth 34 prior to the initial opening.

The screw cap 4 is placed on the base 2. Said screw cap 4 has a cylindrical jacket wall 40 and a cover surface 41. At least one driving dog 42 is integrally formed on the cover surface 41 so as to protrude downwards. A plurality of seals 43 which interact with the spout 20 is provided on the inside of said screw cap 4. Because said seals are not of importance for the present invention, the design and effectiveness thereof will not be further described here. Said screw cap 4 has an inner thread 44. Said inner thread 44 is embodied as fine thread equal to the outer thread 25 of the base 2. An anti-tamper strip 45 is integrally formed at the bottom of the jacket wall 40, said strip being retained in a form-fit manner under the circumferential collar 23 of the base 2 with inwardly directed cams 46. The anti-tamper strip 45 is integrally formed with predetermined breaking point bridges on the jacket wall 40, which are not depicted here. Finally a vertically downwards directed stop bar can be seen on the inside of the base 2, said stop bar being a possible, preferred embodiment of a rotational stop 5. Said rotational stop 5 first comes into operation when the screw cap 4 has been completely twisted off.

Figure 3:
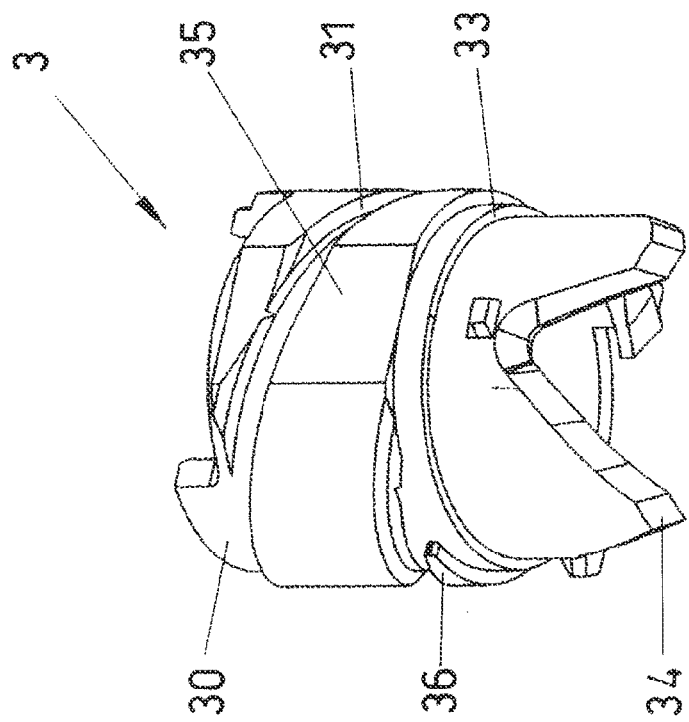

Upon initial opening of the opening device, the screw cap 4 is screwed off, wherein the anti-tamper strip 45 is separated from the jacket wall 40 of the screw cap. At the same time, the driving dog 42 on the underside of the cover surface 41 of the screw cap 4 acts on the driving dog 32 on the inside of the cylindrical pipe section 30 of the cutting element 3. Whereas the screw cap 4 is thus screwed upwards, the cutting element 3 is displaced in a concordant but downwards directed screwing motion. In so doing, the at least one cutting tooth 34 cuts open the film of the container. Only when said screw cap has been completely opened does the rotational stop 5 have an effect. Further explanation from now on makes reference to the FIGS. 2 and 3.

Figure 2:
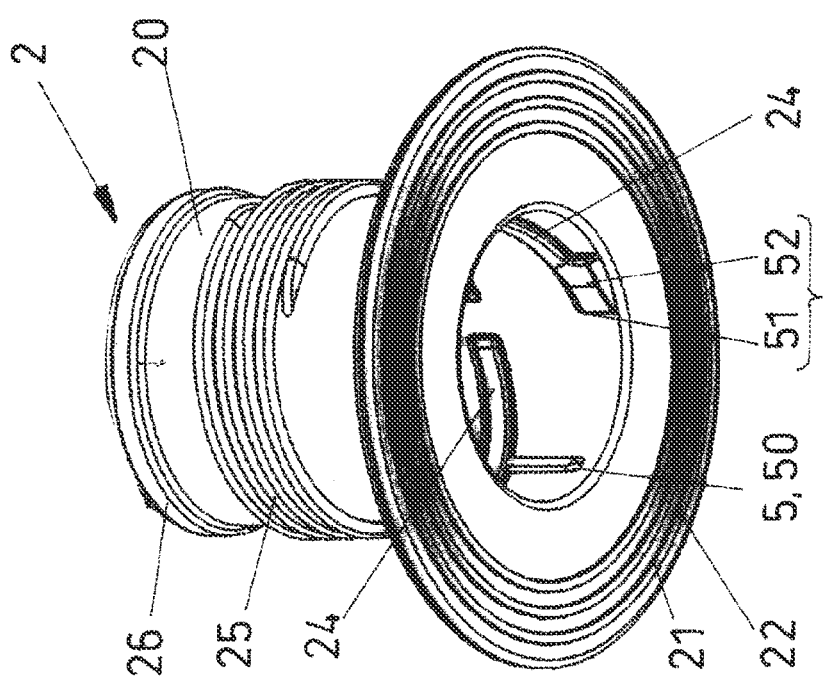

In FIG. 2, the base 2 is seen by itself and the previously described individual features of said base 2 are provided with the same reference numerals. The base 2, as previously described, consists of a cylindrical spout 20 comprising a terminal flange 21. The outer thread 25 on the one hand and the sealing bead 26 on the other hand can be seen on the outside of the spout 20. The inner thread 24, which can be seen by means of the perspective view and which is applied to the interior of the spout 20 from below, is however of particular interest here. Said inner thread 24 comprises an outlet end 51, at which a stop cam 52 is integrally formed. Said stop cam 52 interacts with the outer thread 31 of the cutting element 3, which is depicted by itself in FIG. 3. The cutting element 3 comprises the cylindrical pipe section 30, into which the outer thread 31 is formed, as well as an end face 33 at the lower end of the pipe section 30, whereat at least one cutting tooth 34 is integrally formed. The outer thread 31 comprises an outlet end 36 and said outlet end abuts against the previously mentioned stop cam 52 of the rotational stop 5 in the completely screwed-in state after the initial opening of the device. The rotational stop described up until now is referred to here as the second rotational stop. A first rotational stop 5 is formed by a rotation-inhibiting rib 50, which at the lower region of the inner thread 24 parallel to the rotational axis of the spout 20 is integrally formed on the interior of the jacket wall of said spout 20. Said rib 50 interacts with a recess 35, which is embodied here in the form of a flat spot 35. In the case of an inadvertent relative motion of the cutting element 3 in the base 2, that force would have to be overcome which is required to rotate the rib 50 out of the recess 35. In order to do this, the height of the flattened spot has to practically be overcome. When the user intentionally applies a rotary motion, said force is in fact noticeable but can, however, be overcome with little effort. Nevertheless, the inhibiting effect of said force is sufficient enough that the cutting element does not automatically leave the secured position due to slight relative motions.

The rotational stop 5 in the form of the rib 50 can be sufficient on its own. The rib 50, when the same interacts with the flat spot 35, has an inhibiting effect in both rotational directions. This means that when the rib 50 and the flat spot 35 are in engagement, a force fit is formed, which has to be first overcome in each rotational direction. For this reason, the rotational stop 5 can already sufficiently operate on its own in the combination consisting of the rib 50 and the flat spot 35. Particularly because the driving dogs are normally no longer in engagement in the lowest position, the slight contact of the two driving dogs can also without such a rotational stop lead to a backward movement when the screw cap 4 is repeatedly unscrewed. Due to the existing force-fit, the force required for the tip of the driving dog 42 of the screw cap to jump over the upper end of the driving dog 32 in the cutting element is too large for this to occur. Nevertheless it is useful for the second rotational element in the form of the stop cam 52 at the outlet end 51 of the inner thread 24 to be provided in addition to said rib 50, which is referred to here as the first rotational stop. This results in a form-fit end position, whereby it is definitely ensured that the cutting element 3 can not be completely screwed out of the base 2. At the same time, the first rotational stop 5, 50 is also effective in this position in the region of the flat spot 35, and therefore the cutting element 3 is secured in this position in a force-fit as well as form-fit manner in the spout 20 of the base 2. An optimal solution thus results for the aforementioned problem by means of the combination of the first and the second rotational stop. Although said first rotational stop already meets the aim presented here, provision is made in a preferable manner for both the first as well as the second rotational stop.

The recess 35 can also be in the form of a V-shaped groove or notch running parallel to the rotational axis of the cutting element 3 instead of in the form of a flat spot. As a result, the first rotational stop 5 is then also secured in a form-fit manner.

The invention claimed is:
1. A closeable opening device (1) for a container made from plastic film, said device comprising:
 a base (2), which comprises a cylindrical spout (20) and a flange (21) for mounting on the container;

a screw cap (4), which is screwably connected to the base (2); and a cylindrical cutting element (3) having an outer thread (31), wherein the cutting element (3) is open on both sides in an axial direction and engages an inner thread (20) in the spout (20) of the base (2), wherein at least one driving dog (42) is present in the screw cap (4), which driving dog displaces the cutting element (3) having at least one driving dog (32) arranged therein downwards in a screw-like manner when the screw cap (4) is initially unscrewed, and wherein the cylindrical cutting element (3) has at least one cutting tooth (34) on a lower edge, characterized in that the spout (20) has at least one first rotational stop (5, 50), which secures the cutting element (3) within the spout (20) in a position in which the cutting element (3) is situated immediately after initially unscrewing the screw cap (4) from the base (2), whereby relative motion of the cutting element (3) with respect to the base is prevented, and characterized in that the first rotational stop (5, 50) is a raised portion (50) which is directed towards a center of the spout (20) and interacts with a recess (35) on the cutting element (3) in at least one of a form-fit manner and a force-fit manner.

2. The closeable opening device (1) according to claim 1, characterized in that the first rotational stop (5) is a rib (50) which runs parallel to a central axis of the spout (20) and is disposed below the inner thread (25) on an inner wall of the spout (20).

3. The closeable opening device (1) according to claim 1, characterized in that the recess (35) on the cutting element (3), which interacts with the first rotational stop, is a flat spot.

4. The closeable opening device (1) according to claim 1, characterized in that a second rotational stop (5) is additionally a stop cam (52) integrally formed at a spout end (51) of the inner thread, against which an inlet end (36) of the outer thread (31) on the cutting element (3) is stopped.

5. A closeable opening device (1) for a container made from plastic film, said device comprising:

a base (2) including a cylindrical spout (20) and a flange (21) for mounting on the container;

a screw cap (4) which is screwably connected to the base (2); and a cylindrical cutting element (3) having an outer thread (31), wherein the cutting element (3) is open on both sides in an axial direction and engages an inner thread (20) in the spout (20) of the base (2), wherein the screw cap (4) includes at least one driving dog (42), which driving dog displaces the cutting element (3) having at least one driving dog (32) arranged therein downwards in a screw-like manner when the screw cap (4) is initially unscrewed, and wherein the cylindrical cutting element (3) has at least one cutting tooth (34) on a lower edge, characterized in that the spout (20) has at least one first rotational stop (5, 50), which secures the cutting element (3) within the spout (20) in a position in which the cutting element (3) is situated immediately after initially unscrewing the screw cap (4) from the base (2), whereby relative motion of the cutting element (3) with respect to the base is prevented, and characterized in that the first rotational stop (5, 50) is a raised portion (50) which is directed towards a center of the spout (20) and is force-fit with a recess (35) on the cutting element (3) to inhibit relative motion between the base (2) and the cutting element (3) in both rotational directions.

* * * * *